Lodowick L. Sawyer's Impt. in Curtain Fixture

No. 116996

PATENTED JUL 11 1871

Witnesses
A. J. Tibbits
J. H. Shumway

Lodowick L. Sawyer
Inventor
By his Atty,
John S. Earle

No. 116,996

UNITED STATES PATENT OFFICE.

LODOWICK L. SAWYER, OF SAN FRANCISCO, CALIFORNIA.

IMPROVEMENT IN CURTAIN-FIXTURES.

Specification forming part of Letters Patent No. 116,996, dated July 11, 1871.

*To all whom it may concern:*

Be it known that I, LODOWICK L. SAWYER, of San Francisco, in the county of San Francisco and State of California, have invented a new Improvement in Curtain-Fixtures; and I do hereby declare the following, when taken in connection with the accompanying drawing and the letters of reference marked thereon, to be a full, clear, and exact description of the same, and which said drawing constitutes part of this specification, and represents, in—

Figure 1:
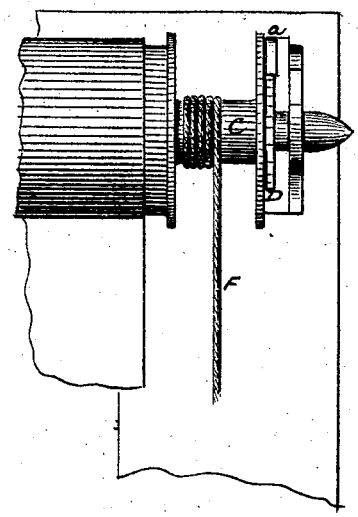
Figure 2:
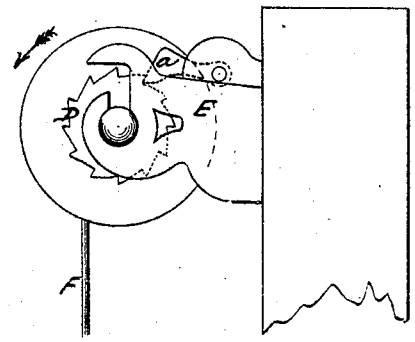
Figure 3:
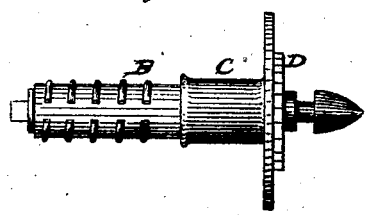

Figure 1, a front view of the end of the curtain-roll to which the fixture is applied for rolling the curtain; Fig. 2, an end view of the same; Fig. 3, the fixture detached; and in Fig. 4, a longitudinal central section of the same.

This invention relates to an improvement in that class of curtain-fixtures in which the curtain is rolled by the drawing down of a cord or similar device which has been previously wound upon the cylinder, combined with a friction sufficient to hold the curtain at any desired elevation, the object being to remove the friction when the curtain is being rolled, but engage it at any point desired; and it consists in a cylinder or shaft constructed to be inserted into the end of the roll, upon which a pressure is made to create sufficient friction to retain the curtain, and the said shaft provided with a ratchet, and a pawl to engage the said ratchet, so that, as the curtain is wound, the pawl allows the free turning of the ratchet, thereby removing the friction, but whenever the winding ceases the ratchet engages the pawl which holds the ratchet, to create the pressure necessary to support the curtain.

Figure 4:
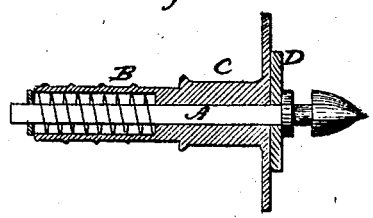

A is the shaft, here represented as extending into a metallic cylinder B, which forms the drum C upon which the cord is wound, as seen in Fig. 1. Upon this shaft a spiral or other spring is arranged substantially as seen in Fig. 4, the tendency of which is to draw the said shaft into the drum or cylinder. Outside the drum a ratchet, D, is fixed to the said shaft, so as to revolve with it, and by the said spring is drawn against the drum with sufficient force to create the friction desired. On the support or bearing E in which the roll is hung, a pawl, *a*, is arranged, as in Fig. 2, to engage in the said ratchet, the teeth of the said ratchet being in such relative position to the said roll that, when the cord F is drawn upon, the roll will be revolved in the direction of the arrow, the teeth of the ratchet escaping from the said pawl, and without friction so far as the pressure upon the shaft A is concerned; but when the cord F is left free, the weight of the curtain, which tends to revolve the roll in the opposite direction, will cause the ratchet to engage with the pawl and there be held, the friction upon the shaft being sufficient to support the weight of the curtain at any point. To lower the curtain, take hold of the curtain and draw down with sufficient force to overcome the friction on the shaft, which will cause the roll to revolve and the curtain to run off, the ratchet being held stationary by the pawl, as before described.

I claim as my invention—

In combination with the drum C upon which the cord is wound for rolling the curtain, the shaft A and ratchet D provided with suitable springs, substantially as described, to create a friction between the said drum and ratchet, and the fixed pawl *a* to act with the said ratchet to apply or remove the friction, in the manner substantially as set forth.

LODOWICK L. SAWYER.

Witnesses:
ORVILLE H. PLATT,
JOHN Q. THAYER.